United States Patent [19]
Bordui et al.

[11] Patent Number: 5,193,097
[45] Date of Patent: Mar. 9, 1993

[54] OPTICAL DEVICE USING A CERIUM-DOPED KTP CRYSTAL

[75] Inventors: Peter F. Bordui, Menlo Park; Richard G. Norwood, San Jose; Ronald Blachman, Sunnyvale, all of Calif.

[73] Assignee: Crystal Technology, Inc., Palo Alto, Calif.

[21] Appl. No.: 838,627

[22] Filed: Feb. 19, 1992

[51] Int. Cl.[5] .............................. H01S 3/10
[52] U.S. Cl. ........................ 372/21; 359/326
[58] Field of Search ................ 372/21; 359/326

[56] References Cited

U.S. PATENT DOCUMENTS 3,949,323  4/1976  Bierlein et al. .................. 359/326
4,761,202  8/1988  Bordui et al. .................... 156/621

Primary Examiner—Leon Scott, Jr.
Attorney, Agent, or Firm—Joseph S. Codispoti

[57] ABSTRACT

An optical element composed of a single crystal consisting essentially of potassium titanyl phosphate, which is represented by the formula $KTiOPO_4$ and which is doped with cerium. The optical element has a high optical transmissivity property for radiation from the near-UV to the mid-infrared spectral regions.

26 Claims, 4 Drawing Sheets

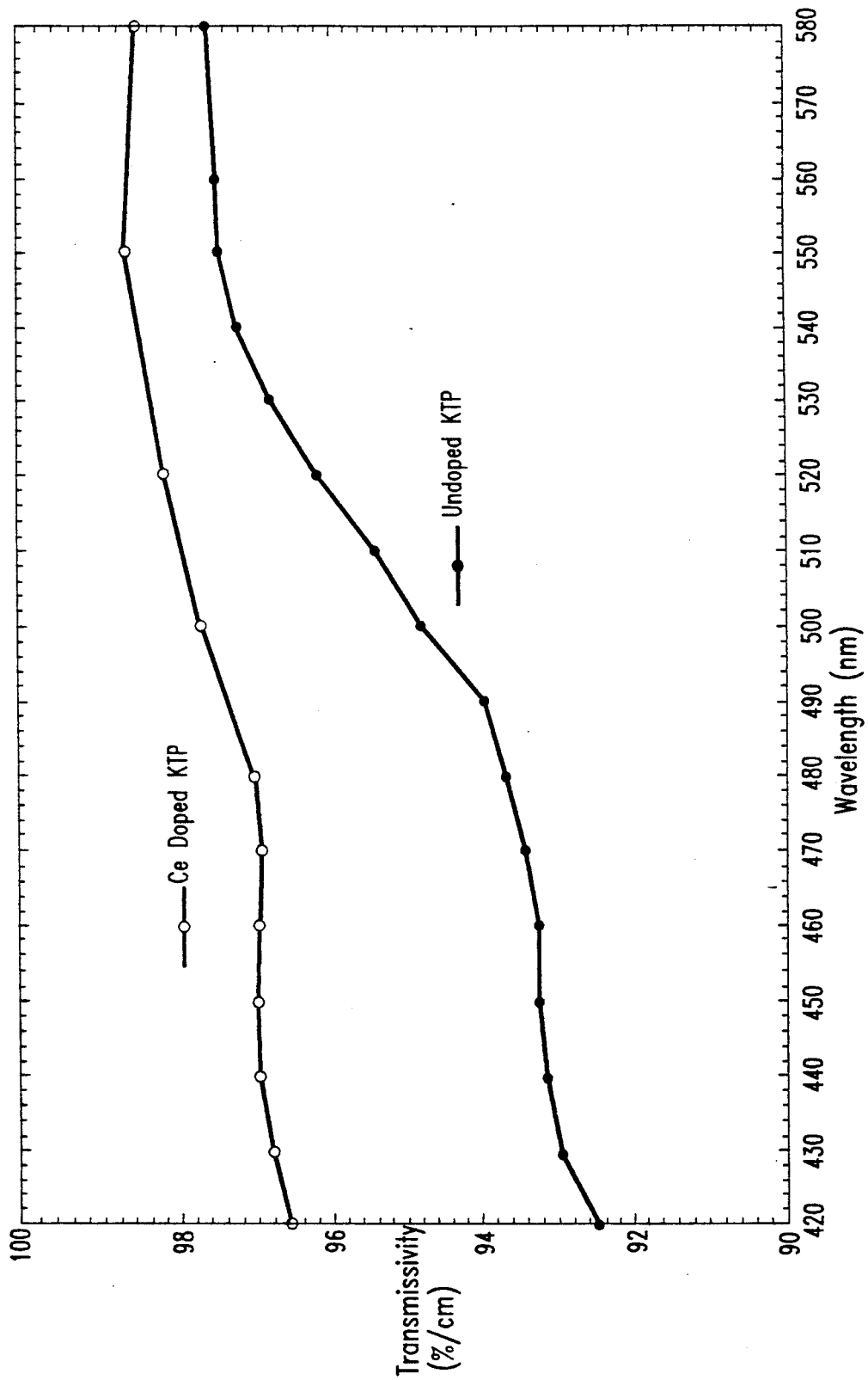
FIG. 2a  Optical Transmission of Undoped and Ce-Doped KTP

OPTICAL DEVICE USING A CERIUM-DOPED KTP CRYSTAL

TECHNICAL FIELD

The invention generally relates to potassium titanyl phosphate (KTP). In particular, the invention relates to KTP doped with cerium to improve its optical transmissivity and to optical devices that utilize a cerium-doped KTP crystal as an optical element.

BACKGROUND OF THE INVENTION

Potassium titanyl phosphate ($KTiOPO_4$; KTP) is a non-linear optical material that belongs to the family of compounds that have the formula unit $MTiOXO_4$, where M can be K, Rb, Tl, $NH_4$ or Cs (partial) and X can be P or As. In single crystal form, KTP has been shown to be useful in a broad range of applications for modulation and frequency conversion of laser radiation. KTP has been shown to be particularly useful as a "doubler" for laser systems to obtain a different frequency radiation from a laser having a fundamental frequency, such as Nd lasers emitting 1 micron radiation. This is described in U.S. Pat. No. 3,949,323 to Bierlein, et al. entitled "CRYSTALS OF (K, Rb, Tl, $NH_4$)TiO(P, As)$O_4$ AND THEIR USE IN ELECTROOPTIC DEVICES".

KTP is valuable in such laser systems because the material has a unique combination of properties. The properties include a large temperature bandwidth, relatively good thermal properties, large nonlinear optical coefficients which are phase matchable, wide acceptance angles and a relatively good resistance to bulk optical damage. KTP also has a high optical transmission (or a low optical absorption) for radiation having wavelengths in the long wavelength visible and the near-infrared (IR) and the mid-IR spectral regions. For such low frequency radiation, KTP is essentially transparent. It is this property (in combination with certain of the other properties) that permits KTP to have superior operating characteristics as a doubler and a modulator for lasers and other optical devices. The basic properties and the applications of KTP are described in the Journal of the Optical Society of America B, Vol. 6, No. 4, "Potassium Titanyl Phosphate: Properties and New Applications" by John D. Bierlein and Herman Vanherzeele, pages 622-633, dated April 1989.

However, it has been found that the optical transmission of KTP for radiation having wavelengths in the visible and the near-ultraviolet (UV) spectral regions is substantially reduced. Further, such reduction occurs at radiation wavelengths significantly distant from the start of the UV cutoff. This characteristic limits the use of KTP as an optical element in lasers and other optical applications. For example, lasers using a KTP crystal for visible and near-UV radiation applications experience a reduced optical frequency conversion efficiency. Further, in such applications, lasers using a KTP crystal undergo excess crystal heating and have a reduced threshold with respect to laser-induced crystal damage.

Consequently, there is a need to improve the optical transmissivity of KTP overall and for radiation having wavelengths in the visible and the near-UV spectral regions. There is also a need to increase the overall optical frequency conversion efficiency of lasers and other optical devices using a KTP crystal as an optical element for visible and near-UV radiation applications. There is also a need to reduce the crystal heating and to increase the threshold of laser-induced crystal damage of lasers and other optical devices using a KTP crystal as an optical element.

SUMMARY OF THE INVENTION

Briefly, the invention provides a single crystal KTP, comprising cerium as a dopant. The cerium-doped KTP crystal may have increased optical transmissivity. Further, the amount of cerium may be approximately 5 ppm.

The invention also provides an optical frequency converter that has a source of electromagnetic radiation; means for directing the radiation generated by the source; and a cerium-doped KTP crystal that receives incident radiation from the means for directing and emits radiation having at least one frequency different from the frequency of the incident radiation. The converter may also include means for collimating the radiation emitted by the crystal and a filter that receives the radiation emitted by the crystal and permits only radiation having a predetermined frequency to pass therethrough.

The invention also provides an electro-optic modulator that has a source of electromagnetic radiation; means for directing the radiation generated by the source; a cerium-doped KTP crystal that receives incident radiation from the means for directing and emits radiation of a predetermined polarization; and means for applying an electric field across the crystal to change the birefringence, whereby the polarization of the radiation emitted by the crystal is altered. The modulator may also include a polarizer that permits only radiation emitted by the crystal having a polarization that is altered by the means for applying to pass therethrough.

The invention further provides a method of increasing the optical transmissivity of a KTP crystal by doping the crystal with cerium. The cerium doping may be accomplished by preparing a mixture of cerium oxide and a solution of KTP and growing KTP crystals from said mixture using a slow cooling flux growth method or a hydrothermal process, said resultant grown KTP crystals being doped with cerium. The KTP solution may comprise KTP dissolved in a liquid with the effective composition of $K_6P_4O_{13}$. The mixture may have at least a 1 mol % concentration of cerium oxide. Further, the concentration of cerium may be approximately 5 ppm.

The invention further provides a method of growing a cerium-doped crystal of KTP from solution by preparing a mixture of a KTP solution and $CeO_2$; heating said mixture to produce a melt thereof; and slowly decreasing the temperature of said melt to thereby cause cerium-doped KTP to spontaneously crystalize from said melt. The KTP solution may comprise KTP dissolved in a liquid with the effective composition of $K_6P_4O_{13}$. The mixture may have at least a 1 mol % concentration of $CeO_2$.

In addition, the invention provides a single crystal of a composition of the formula $MTiOXO_4$ wherein M is selected from the group consisting of K, Rb, Tl, $NH_4$ and Cs and X is selected from the group consisting of P and As, comprising cerium as a dopant. The invention further provides a method for increasing the optical transmissivity of a crystal of a composition of the formula $MTiOXO_4$ wherein M is selected from the group consisting of K, Rb, Tl, $NH_4$ and Cs and X is selected from the group consisting of P and As, comprising the step of doping the crystal with cerium.

Advantageously, cerium-doped KTP significantly increases KTP's optical transmissivity, particularly for radiation having wavelengths in the visible and the near-UV spectral regions. Further, lasers and other optical devices that utilize a cerium-doped KTP crystal as an optical element for visible and near-UV radiation applications have an improved overall conversion efficiency. Further, lasers and other optical devices that utilize a cerium-doped KTP crystal as an optical element also have reduced crystal heating and an increased threshold for laser-induced crystal damage.

BRIEF DESCRIPTION OF THE DRAWINGS

For a better understanding of the invention, reference is made to the following description of an exemplary embodiment thereof, and to the accompanying drawings, wherein:

FIG. 2a is a combined graph of the optical transmissivity of undoped KTP and of cerium-doped KTP of the present invention versus the wavelength of radiation transmitted by the undoped KTP and by the cerium-doped KTP, respectively, over a first range of wavelengths;

DETAILED DESCRIPTION

Figure 1:
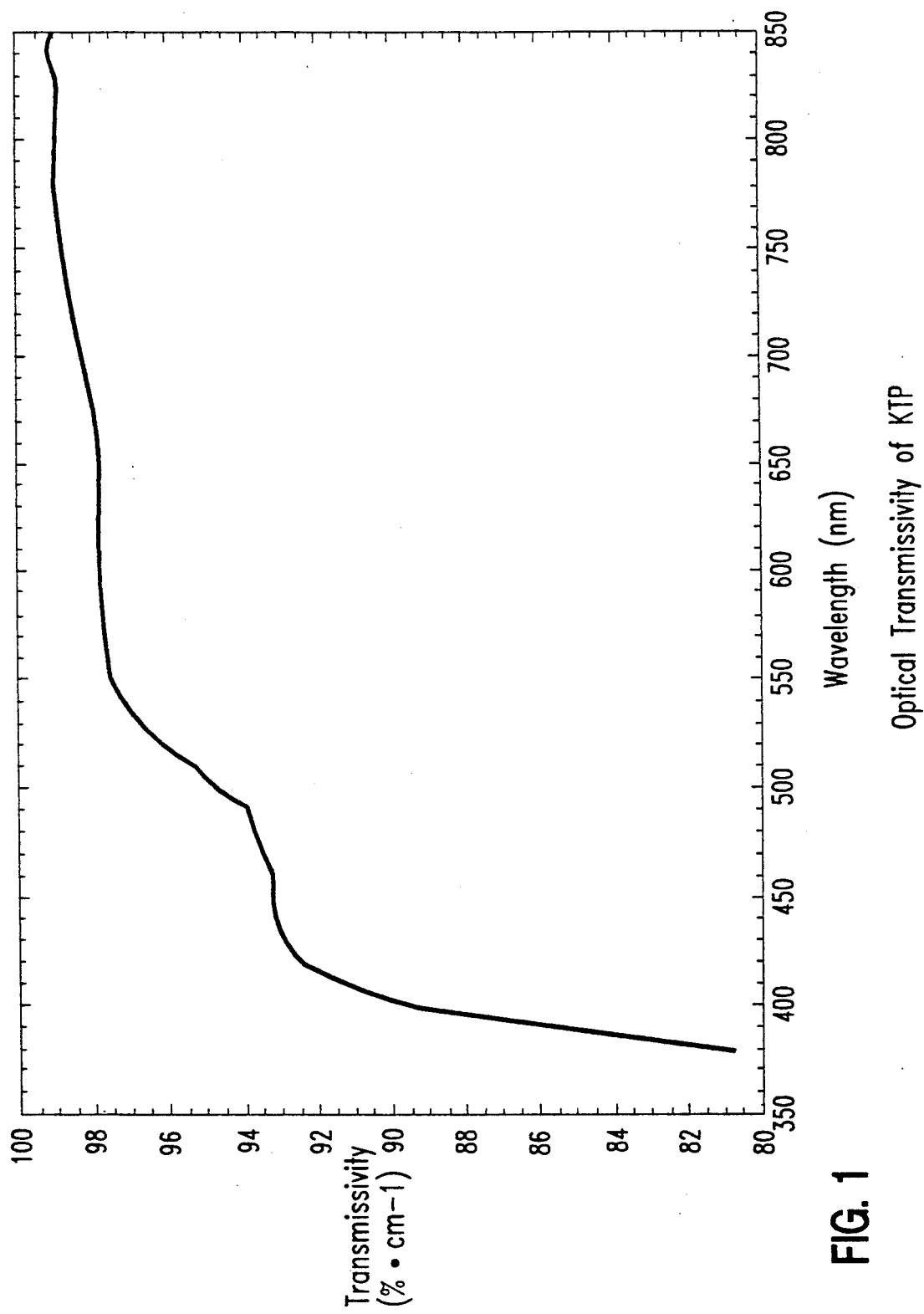
FIG. 1 is a graph of the optical transmissivity of KTP versus the wavelength of radiation transmitted by KTP.

FIG. 1 is a graph of the optical transmissivity of KTP versus the wavelength of radiation transmitted by KTP. As shown, for radiation with wavelengths starting at approximately 550 nm and higher (i.e., the long wavelength visible and the near and mid-IR spectral regions), KTP has a high optical transmission (approximately 98% and higher) and is essentially transparent. However, the optical transmission of KTP for radiation with wavelengths starting at approximately 550 nm and lower (i.e., the visible and the near-UV spectral regions) is substantially reduced. Moreover, the reduction of the optical transmissivity occurs at the visible light wavelengths significantly distant (approximately 550 nm) from the UV cutoff (of approximately 350 nm). Thus, for visible and near-UV radiation applications, KTP is not essentially transparent and is less useful as an optical element for optical devices.

To overcome this limiting characteristic, either a mechanism which compensates for the reduced optical transmission must be developed for optical devices that use a KTP crystal as an optical element or the KTP crystal must be altered to improve the optical transmissivity property. It is known to dope a KTP crystal with elements or other additives in order to change and enhance certain properties of KTP. For instance, doping a KTP crystal with gallium significantly reduces the electrical conductivity of KTP. A similar result is achieved by doping a KTP crystal with aluminum.

Figure 2B:
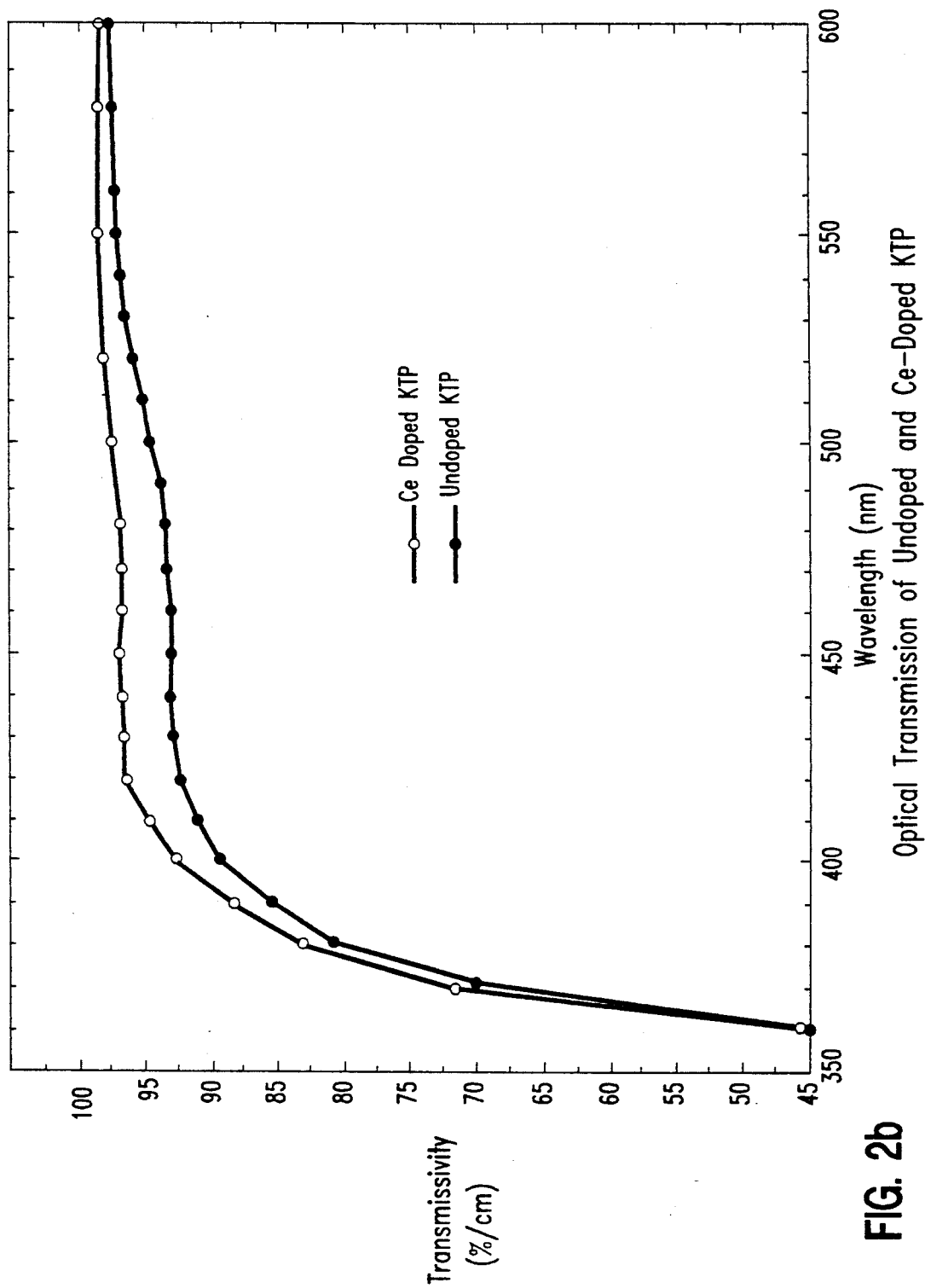
FIG. 2b is a combined graph of the optical transmissivity of undoped KTP and of cerium-doped KTP of the present invention versus the wavelength of radiation transmitted by the undoped KTP and by the cerium-doped KTP, respectively, over a second range of wavelengths.

FIGS. 2a and 2b are each a combined graph of the optical transmissivity of an undoped KTP crystal and of a cerium-doped KTP crystal of the present invention versus the wavelength of the radiation transmitted by the undoped KTP crystal and by the cerium-doped KTP crystal, respectively. As illustrated in the figures, it has been discovered that doping a KTP crystal with cerium improves the overall optical transmissivity of the KTP crystal. Moreover, cerium doping particularly improves the optical transmissivity of the KTP crystal for radiation having wavelengths in the visible and the near-UV spectral regions. For example, an undoped KTP crystal is essentially transparent (approximately 97.5% optical transmission) for radiation at the visible wavelength of 580 nm; for the same radiation, the cerium-doped KTP crystal has an increased optical transmission of approximately 98.5%. Further, an undoped KTP crystal has a substantially reduced optical transmission (approximately 93%) for radiation at the visible light wavelength of 420 nm; in contrast, the cerium-doped KTP crystal has a relatively high optical transmissivity (approximately 96.5%) for the same radiation. In fact, the figures show that the cerium-doped KTP crystal maintains a relatively high optical transmissivity for radiation throughout the entire visible spectral region (from approximately 600 nm to 420 nm).

Moreover, the reduction of the optical transmissivity for the cerium-doped KTP crystal occurs at the visible light wavelength of approximately 420 nm. This is in stark contrast to the reduction characteristic of an undoped KTP crystal which starts at approximately 530 nm. Note that the cerium-doped KTP crystal also demonstrates a higher optical transmissivity, although substantially reduced, than an undoped KTP crystal for radiation having wavelengths shorter than 420 nm.

A cerium-doped KTP crystal of the present invention can be produced by the any of the same and well-known processes used for producing undoped KTP crystals, such as hydrothermal processes (i.e., involving high pressure aqueous solution growth), flux growth methods, etc. The following flux growth method is representative and was used to produce cerium-doped KTP crystals of the present invention. Broadly, in the method, cerium-doped KTP crystals were produced by first adding measured amounts of cerium oxide ($CeO_2$) to a KTP solution. The KTP solution may be, for example, a $KTP/K_6P_4O_{13}$ solution (or a $K_6P_4O_{13}$ flux) wherein KTP is dissolved in a liquid with an effective formula composition of $K_6P_4O_{13}$. The solution was mixed; heated to a temperature at which all the solids were in the solution; and then slowly cooled over a period of days to a substantially lower temperature. Cerium-doped KTP crystals were subsequently recovered.

More particularly, a mixture of 826 grams of powder $KH_2PO_4$, 220 grams of powder $TiO_2$, 568 grams of powder $K_2HPO_4$, 9.8 grams of powder $CeO_2$ was ball milled for one hour. The powder mixture was then poured into two 127 millimeter diameter by 64.5 millimeter high cylindrical platinum crucibles which were placed in a muffle furnace. The internal temperature of the furnace was 1050° C. After 24 hours, both crucibles were removed from the muffle furnace, and the liquid of one crucible was poured into the other. The liquid was then placed back into the muffle furnace.

After one hour, a hollow platinum stirring paddle affixed to the end of a rotatable shaft was introduced into the liquid. The paddle was rotated in the liquid at 72 RPM reversing direction every 4 rotations for 20 hours during which time the temperature was maintained at 1000° C. The paddle temperature was suppressed 5° C. by flowing nitrogen gas through the center of the paddle at a rate of 4 cubic feet per hour. The furnace temperature was then ramped to 968° C. over a period of 4 hours. The temperature of the furnace was set to continually decrease at a rate of 4° C. per day. After 48 hours, the temperature decrease rate was changed to 2° C. per day.

After 20 days, the paddle was withdrawn 9 centimeters and the furnace temperature was ramped to 30° C. over a period of 36 hours. A number of spontaneously nucleated cerium-doped KTP crystals were recovered from the paddle and crucible, the largest of which measured roughly 1.5 by 3.0 by 5.0 cubic centimeters. Further, the cerium-doped KTP crystals were visually less colored than standard undoped KTP crystals.

Doping concentrations of 1 and 2 mol % of cerium oxide were utilized in the above-described method and the data of FIGS. 2a and 2b pertaining to a cerium-doped KTP crystal were derived from such a crystal produced using a 2 mol % doping concentration of cerium oxide. The amount of cerium in a cerium-doped KTP crystal produced using a 1 mol % doping concentration of cerium oxide was found to be approximately 5 parts per million (ppm) using semi-quantitative spark source mass spectrometry; the amount of cerium in a cerium-doped KTP crystal produced using a 2 mol % doping concentration of cerium oxide was also found to be approximately 5 ppm. The terms "parts per million" and "ppm" refer to parts by weight unless otherwise noted. Note that, although one would expect the cerium amount to increase with an increase in the doping concentration of cerium oxide, the cerium amount using the 2 mol % doping concentration is within the standard error range. As a comparison, the amount of cerium as an impurity in an undoped KTP crystal has been found to be less than 0.5 ppm.

Note that a cerium-doped KTP crystal of the present invention may contain unavoidable impurities or contaminants other than cerium.

Figure 3:
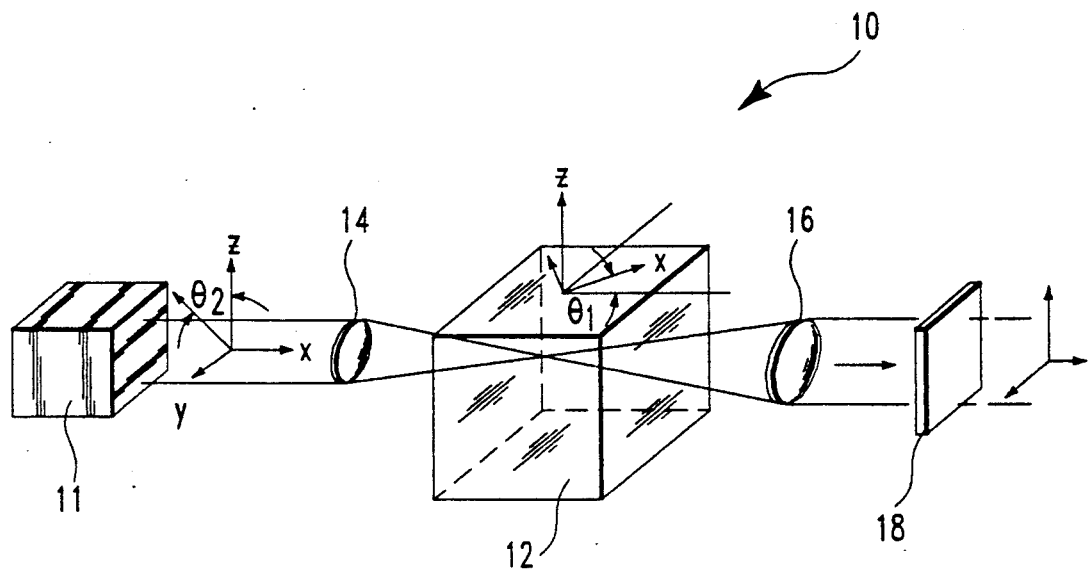
FIG. 3 is a schematic diagram of an optical device utilizing a cerium-doped KTP crystal of the present invention to generate second harmonic radiation.

FIG. 3 is a schematic diagram of an optical device 10 utilizing a cerium-doped KTP crystal of the present invention to generate second harmonic radiation. The optical device 10 comprises a light source 11, such as a laser, that generates a polarized light of a first predetermined wavelength which is incident on a cerium-doped KTP crystal 12 of the present invention along an optical path through the crystal 12. The crystal 12 is oriented so that its z axis is vertical and its x axis is at a first predetermined angle $\Theta_1$ to the optical path and the plane of polarization of the incident light is oriented at a second predetermined angle $\Theta_2$ from the z direction. The optical device 10 also has a first lens 14 having a predetermined focal length that focuses the light from the source 11 into the crystal 12 and a second lens 16 having a predetermined focal length that collimates light emerging from the crystal 12. The optical device also has a filter 18 that receives the collimated light from the second lens 16 and blocks light of the first predetermined wavelength while passing light of a second predetermined wavelength.

In operation, the light source 11 generates light that passes through the crystal 12. Upon passing through, the light emerging from the crystal 12 comprises light of the first predetermined wavelength and light of the second harmonic. The filter 18 is configured so that the second predetermined wavelength is the second harmonic of the incident light. Consequently, the light that emerges from the filter 18 is light of the second harmonic of the incident light having its plane of polarization perpendicular to the z direction. Critical and non-critical phase matching conditions are satisfied by the selection of certain optical conditions. In this manner, the optical device 10 can generate second harmonic light.

Figure 4:
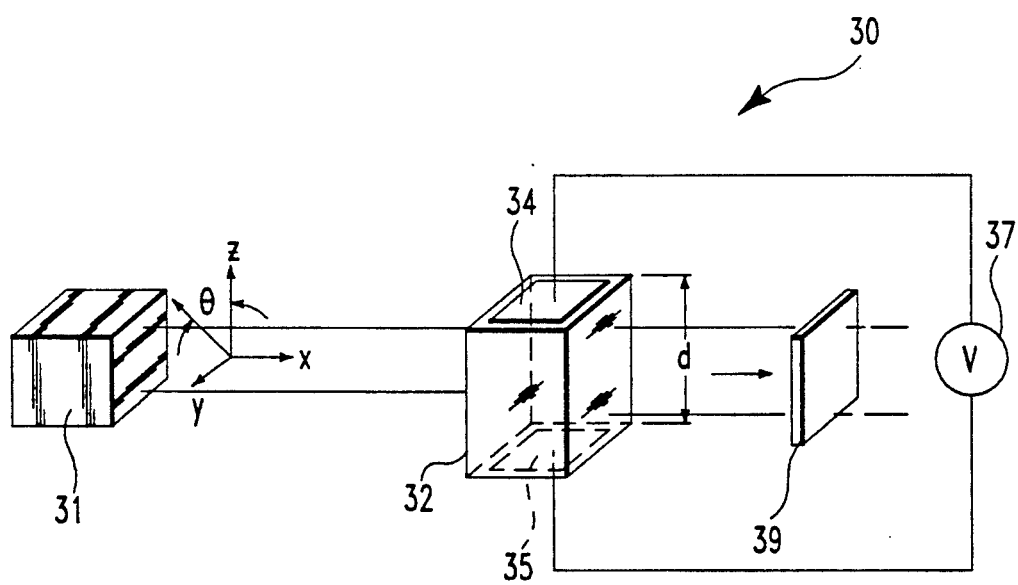
FIG. 4 is a schematic diagram of an optical device utilizing a cerium-doped KTP crystal of the present invention to modulate the intensity of a beam of radiation.

FIG. 4 is a schematic diagram of an optical device 30 utilizing a cerium-doped KTP crystal of the present invention to modulate the intensity of a beam of radiation. The optical device 30 comprises a light source 31, such as a laser, that generates a polarized light of a predetermined wavelength which is incident on a cerium-doped KTP crystal 32 of the present invention along an optical path through the crystal 32. The crystal 32 is cut as a cube with faces perpendicular to the x, y and z axes. The plane of polarization of the light is oriented at a predetermined angle $\Theta$ from the z direction and the crystal 32 is oriented with its x axis along the optical path. The optical device 30 also has two electrodes 34, 35 which are placed on the two opposing faces of the crystal 32 cut perpendicular to the z axis and which are spaced apart a predetermined distance d. The optical device 30 also has a voltage source 37 that applies a voltage V across the two electrodes 34, 35. Further, the optical device has a polarizer 39 that receives light emerging from the crystal 32.

In operation, the light source 31 generates light that passes through the crystal 32. Upon passing through, the y component of the light is retarded with respect to the z component by a formulated amount that depends upon the distance the light traveled through the crystal 32, i.e., the path length. By selecting the path length to meet certain conditions, the light emerging from the crystal 32 can be polarized 90 degrees with respect to the incident light. The polarizer 39 is set to block this polarized light emerging from the crystal 32. However, with the voltage source 37, the optical device 30 can apply a voltage V across the crystal 32 (via the two electrodes 34, 35) that changes the retardation amount, and thus the polarization of the emerging light, to permit a certain amount of light to pass through the polarizer 39. In this manner, the optical device 30 can modulate the intensity of a light beam.

The embodiments described herein are merely illustrative of the principles of the present invention. Various modifications may be made thereto by persons ordinarily skilled in the art, without departing from the scope or spirit of the invention. For example, other doping concentrations of cerium oxide may be used to produce cerium-doped KTP crystals of the present invention. Also, seed crystals may be used in the growth methods of producing cerium-doped KTP crystals, especially to obtain better control of the growth method and larger sized crystals. Also, the growth methods of producing cerium-doped KTP crystals may be modified to insure that particular thermal field conditions are maintained, especially to promote growth and to obtain larger sized crystals.

Further, the invention may provide cerium-doped crystals of the analogues of KTP, i.e., materials or compounds having the formula unit $MTiOXO_4$ as described above.

What is claimed is:

1. An optical element, comprising a single crystal of potassium titanyl phosphate, which is represented by the formula $KTiOPO_4$ and doped with cerium.

2. The optical element of claim 1, wherein the amount of cerium is approximately 5 ppm.

3. The optical element of claim 1 which has a high optical transmissivity property.

4. An optical frequency converter, comprising:
   a. a source of electromagnetic radiation;
   b. means for directing the radiation generated by the source; and
   c. a crystal that receives incident radiation from the means for directing and emits electromagnetic radiation having at least one frequency different from the frequency of the incident radiation, the crystal consisting essentially of potassium titanyl phosphate, which is represented by the formula $KTiOPO_4$ and doped with cerium.

5. The converter of claim 4, further comprising:
   a. means for collimating the radiation emitted by the crystal; and
   b. a filter that receives the radiation emitted by the crystal and permits only radiation having a predetermined frequency to pass therethrough.

6. The converter of claim 4, wherein the crystal has a high optical transmissivity property.

7. An electro-optic modulator, comprising:
   a. a source of electromagnetic radiation;
   b. means for directing the radiation generated by the source;
   c. a birefringent crystal that receives incident radiation from the means for directing and emits electromagnetic radiation of a predetermined polarization, the crystal consisting essentially of potassium titanyl phosphate, which is represented by the formula $KTiOPO_4$ and doped with cerium; and
   d. means for applying an electric field across the crystal to change the birefringence, whereby the polarization of the radiation emitted by the crystal is altered.

8. The modulator of claim 7, further comprising a polarizer that permits only radiation emitted by the crystal having a polarization that is altered by the means for applying to pass therethrough.

9. The modulator of claim 7, wherein the crystal has a high optical transmissivity property.

10. A single crystal $KTiOPO_4$, comprising cerium as a dopant.

11. The crystal of claim 10, wherein the $KTiOPO_4$ has increased optical transmissivity.

12. The crystal of claim 10, wherein the concentration of cerium is approximately 5 ppm.

13. A method of growing a cerium-doped crystal of $KTiOPO_4$ from solution, comprising the steps of:
   a. preparing a mixture of a $KTiOPO_4$ solution and $CeO_2$;
   b. heating said mixture to produce a melt thereof; and
   c. slowly decreasing the temperature of said melt to thereby cause cerium-doped $KTiOPO_4$ to spontaneously crystalize from said melt.

14. The method of claim 13, wherein the $KTiOPO_4$ solution comprises $KTiOPO_4$ dissolved in a liquid with the effective composition of $K_6P_4O_{13}$.

15. The method of claim 13, wherein said mixture has at least a 1 mol % concentration of $CeO_2$.

16. A method of increasing the optical transmissivity of a $KTiOPO_4$ crystal, comprising the step of doping the crystal with cerium.

17. The method of claim 16, wherein the step of doping comprises:
   a. preparing a mixture of cerium oxide and a solution of $KTiOPO_4$; and
   b. growing $KTiOPO_4$ crystals from said mixture using a slow cooling flux growth method, said resultant grown $KTiOPO_4$ crystals being doped with cerium.

18. The method of claim 17, wherein said mixture has at least a 1 mol % concentration of cerium oxide.

19. The method of claim 17 wherein the $KTiOPO_4$ solution comprises $KTiOPO_4$ dissolved in a liquid with the effective composition of $K_6P_4O_{13}$.

20. The method of claim 16, wherein the step of doping comprises:
   a. preparing a mixture of cerium oxide and a solution of $KTiOPO_4$; and
   b. growing $KTiOPO_4$ crystals from said mixture using a hydrothermal process, said resultant grown $KTiOPO_4$ crystals being doped with cerium.

21. The method of claim 16, wherein the concentration of cerium is approximately 5 ppm.

22. An optical element, comprising a single crystal of a composition of the formula $MTiOXO_4$ wherein M is selected from the group consisting of K, Rb, Tl, $NH_4$ and Cs and X is selected from the group consisting of P and As, and doped with cerium.

23. The optical element of claim 22 which has a high optical transmissivity property.

24. A single crystal of a composition of the formula $MTiOXO_4$ wherein M is selected from the group consisting of K, Rb, Tl, $NH_4$ and Cs and X is selected from the group consisting of P and As, comprising cerium as a dopant.

25. The crystal of claim 24, wherein the crystal has increased optical transmissivity.

26. A method of increasing the optical transmissivity of a crystal of a composition of the formula $MTiOXO_4$ wherein M is selected from the group consisting of K, Rb, Tl, $NH_4$ and Cs and X is selected from the group consisting of P and As, comprising the step of doping the crystal with cerium.

* * * * *

UNITED STATES PATENT AND TRADEMARK OFFICE
CERTIFICATE OF CORRECTION

PATENT NO. : 5,193,097
DATED : Mar. 9, 1993
INVENTOR(S) : Bordui et al.

It is certified that error appears in the above-identified patent and that said Letters Patent is hereby corrected as shown below:

Cover Page

Item [56]
after "References Cited" insert:

--U.S. Patent 4,305,778  12/1981  Gier

U.S. Patent 4,231,838  11/1980  Gier

Journal of the Optical Society of America B, Vol. 6, No. 4, "Potassium Titanyl Phosphate: Properties and New Applications" by John D. Bierlein et al., dated April 1989, pg. 622-633.

Journal of Crystal Growth 84 (1987) "Growth of Large Single Crystals of KTiOP4 (KTP) From High-Temperature Solution Using Heat Pipe Based Furnace System" by P.F. Bordui et al., pg. 403-408.--

Signed and Sealed this

Twelfth Day of April, 1994

*Attest:*

BRUCE LEHMAN

*Attesting Officer*

Commissioner of Patents and Trademarks